Figure 1:
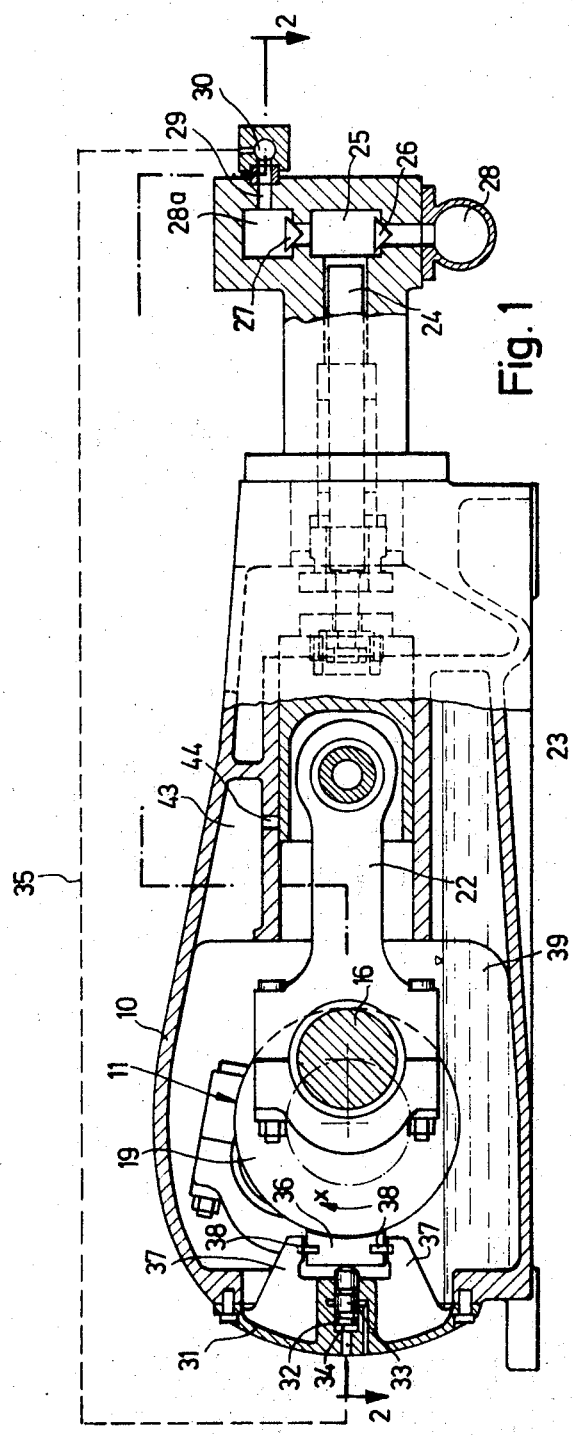

United States Patent [19]
Lieb

[11] 3,760,694
[45] Sept. 25, 1973

[54] MULTI-CYLINDER CRANKSHAFT MACHINE, IN PARTICULAR A RECIPROCATING PUMP OR COMPRESSOR

[76] Inventor: Walter Lieb, Jahnstrasse-12, Dettingen, Germany

[22] Filed: Oct. 27, 1971

[21] Appl. No.: 193,122

[30] Foreign Application Priority Data
Nov. 3, 1970   Germany.................. P 20 53 987.1

[52] U.S. Cl...................... 92/73, 74/44, 123/192 R, 308/35, 417/539
[51] Int. Cl.............................................. F01b 1/02
[58] Field of Search........................... 92/73; 74/44; 308/35; 123/192 B, 192 R; 417/539

[56] References Cited
UNITED STATES PATENTS

| | | |
|---|---|---|
| 2,650,545 | 9/1953 | Cornelius...................... 417/539 X |
| 3,468,190 | 9/1969 | Sampietro.................. 123/192 B X |
| 3,570,372 | 3/1971 | Campbell............................. 91/496 |
| 2,455,330 | 11/1948 | Denison, Jr...................... 91/486 X |
| 2,827,859 | 3/1958 | Crane .............................. 91/486 X |
| 2,908,138 | 10/1959 | Warren.............................. 92/73 X |
| 3,053,195 | 9/1962 | Williamson........................ 92/73 X |

*Primary Examiner*—Martin P. Schwadron
*Assistant Examiner*—Abe Hershkovitz
*Attorney*—Michael S. Striker

[57] ABSTRACT

The main object of the invention is a multi-cylinder crankshaft engine the crankshaft of which is non-positively supported between its bearings on the side opposite to the engine pistons, for instance by spring means and preferably by a fluid pressure varying substantially proportionately to the variation of the force exerted by the engine pistons to the crankshaft.

20 Claims, 5 Drawing Figures

MULTI-CYLINDER CRANKSHAFT MACHINE, IN PARTICULAR A RECIPROCATING PUMP OR COMPRESSOR

Multi-cylinder crankshaft machine — in particular a reciprocating pump or compressor.

The invention concerns a multi-cylinder crankshaft machine, in particular a reciprocating pump or compressor in which the crankshaft has crank pins separated from one another by crank arms.

The normal arrangement of bearings on crankshafts is such, that, in the case of just a few cylinders, the bearings are mounted at the ends only, and in the case of a greater amount of cylinders, they are mounted both at the ends and additionally between the individual arms or crank pins.

In the first case, the crankshaft is statically determined but is subjected to greater bending strain, the strain becoming greater the larger the crankshaft is. In the second case, whilst the bending force is greatly reduced, the shaft is statically indetermined, which necessitates special fitting methods. Above all, the arrangement of the intermediate bearings means a correspondingly greater overall length which is in turn bound up with increased weight and higher production costs.

It is also known for crankshafts to be mounted on their crank arms which are then constructed as bearing discs and rotate in roller bearings, ball bearings etc. This type of shaft is also statically indetermined and involves high production costs.

A main object of the invention is to make possible a statically determined crankshaft mounting and an effective absorption of the working forces without greater bending strain on the crankshaft.

A further important object of the invention is the shortest possible overall machine length. Thus, together with the above-mentioned object, the advantages of the different systems are essentially combined, without the disadvantages of each as far as is possible. Accordingly, one feature of the invention is that the crankshaft is non-positively supported or that yieldable pressure means are applied to the crankshaft between the crankshaft bearings on the side opposite to the main pistons in order to absorb the pressures exerted by the pistons via whatever means transmits the working force, usually connecting rods.

The non-positive pressure of the support device can be effected mechanically by means of spring power or by means of hydraulic or pneumatic pressure.

A further important object of the invention is that the non-positive support serving to take up the working pressure, counterbalances this pressure to the greatest extent.

Accordingly as a further feature of the invention the supports are pressed against the crankshaft with a pressure force dependant on the pressure of one of the feed fluids supplied by the machine. Hereby it is possible for the supporting pressure to increase or decrease according to the pressure within the feed system, so that working pressure and supporting pressure are at any one time at least partly counterbalanced, eliminating bending strain on the crankshaft to the greatest extent. If the machine, for example a pump, (the term pump is also used to cover compressors from here on) is idling, no supporting pressures are produced. If the pressure of the feed medium is increased, then the supporting pressure is increased proportionately or roughly proportionately with this increase. If the machine is switched back to idling, the support pressures are automatically reduced.

The supporting device which is pressed against the crankshaft in the manner of a piston can be subjected to the pressure in the main pressure chamber of the pump, or to the pressure in a pump feed system, or to a pressure independent of these. Therefore it is also possible to employ an independent pressure generator for the support device, independent of the working pressure system. For transmitting and exerting the pressure force independently of the pressure of a feed fluid, a mechanical or a hydraulic rod system can be provided, which is connected directly or indirectly to the feed system of the machine.

If the machine is constructed as a pump for feeding a pressure medium such as 'Karbamat' that would have a detrimental effect on the bearing, then a practical method of applying the supporting device pressure is by means of intermediate switching members such as diaphragms etc.

Furthermore, with this invention, measures have been taken to lubricate the support surfaces on the crank arms in such a way as to provide trouble-free operation. Thus, for example, particularly in the case of a horizontally designed machine, the supporting device is so constructed on the side of it facing the oil sump of a dip lubrication system working in conjunction with the cylindrical surface of the crankshaft, that between the crankshaft surfaces and the supporting device, a wedge-shaped channel tapering in the direction of rotation of the crankshaft is formed for the lubricant collected by the crankshaft.

Further objects of the invention concern a favourable arrangement and mounting of the non-positive crankshaft supporting device in the circumferential direction, particularly to prevent displacement through the friction created between the support and the crankshaft, or in the axial direction of the crankshaft.

Further objects of the invention concern a favourable taking up of the pressure forces exerted upon the crankshaft through the machine housing, especially with horizontally designed machines, as well as a favourable absorption of the pressure forces loading the transmission members. In accordance with another feature for the simplification of the invention, the application of the support means is effected by hydraulic pressure, which is created in the bearing clearance between one support device and the crankshaft. In conjunction with a relatively weak spring, which backs up the supporting force, the supporting force can, if necessary, increase so much that extensive force equalization takes place. This measure is mainly of interest when it is not possible to effect the pressure by utilizing the feed fluid supplied by the machine.

Further objects and features of the invention can be taken from the following description of application examples. Here are illustrated FIG. 1 a section through the axle of a pump piston from a pump following the invention principle, in the section as per line 1—1 in FIG. 2, FIG. 2 a section as per line 2—2 in FIG. 1, FIG. 3 an explanatory sketch to FIG. 2, FIG. 4 a section corresponding to FIG. 1 through a further type of machine following the invention principle and, FIG. 5 a type for producing the support pressure from the bearing clearance of a support ring.

Figure 2:
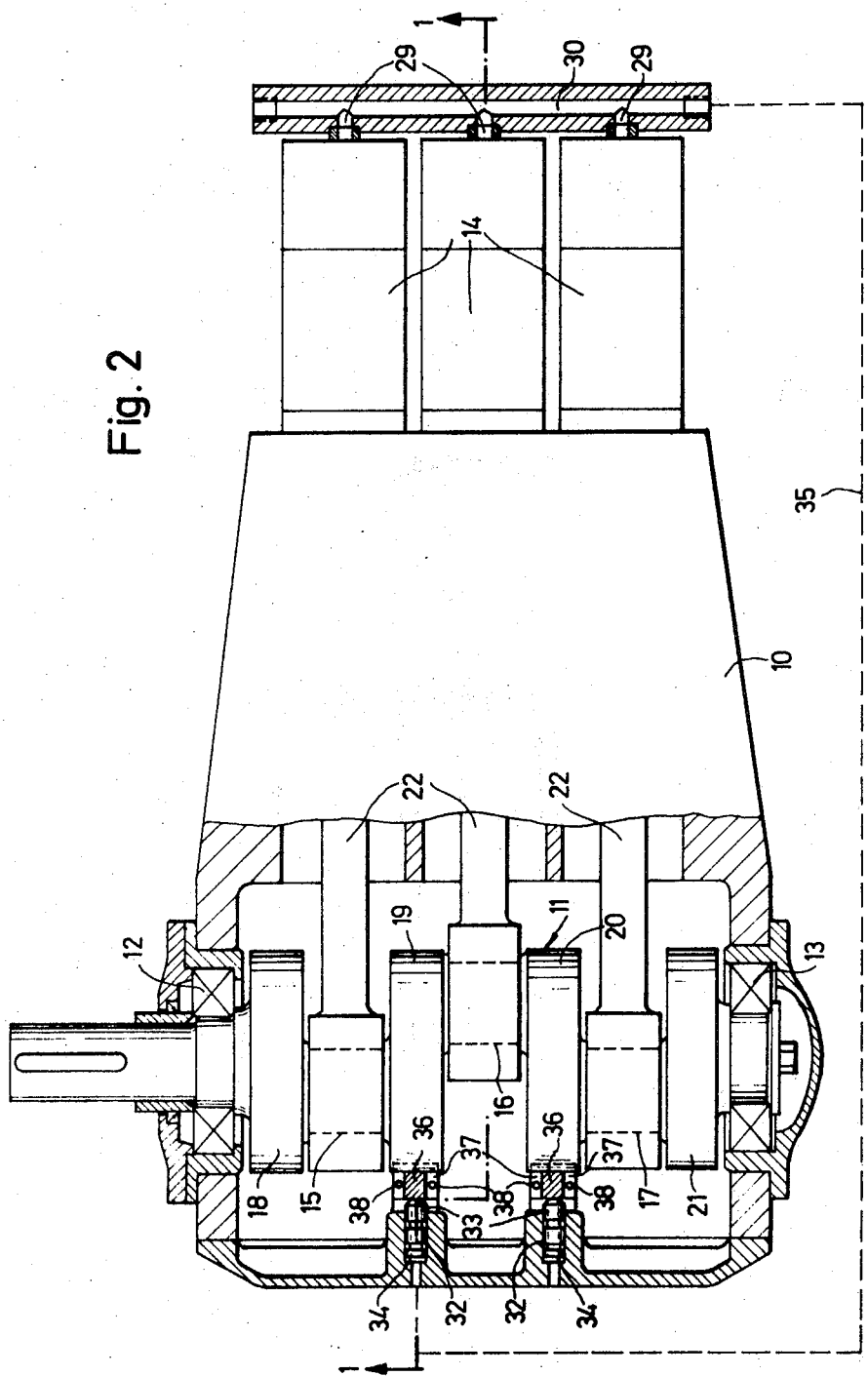

In the embodiment shown in FIGS. 1 and 2, the crankshaft (11) is mounted in the machine housing (10) on two end bearings (12 and 13). The crankshaft is bent at right angles three times according to the three cylinders (14) and has three crank pins or stroke pins (15, 16 and 17) as well as four crank arms (18, 19, 20 and 21). Normally a connecting rod (22) is mounted on each crank pin as means of a power transmission, and it is coupled via a piston-like cross-head (23) to a plunger piston (24) which works in a pump chamber (25) with a suction valve (26) and a pressure valve (27). The working medium or fluid being transported by the pump is sucked up out of a suction channel (28) via suction valve (26) and then conveyed via pressure valve (27), pressure chamber (28a) and pressure outlet channel (29) into a pressure collecting channel (30), which leads to the point of use.

Concordant with the invention principle, the crankshaft (11) is supported non-positively on the side facing the connecting rods (22) or pump pistons (24). For this purpose, two cylinders (32) are arranged in the cover (31) of the machine housing, and these are aligned radially or almost radially to the crankshaft. A piston (33) slides in each one and its outwardly arranged piston chambers (34) are connected by a pipe (35) to the pressure collecting channel (30) of the pump. Each of the pistons acts on one of the two centre disc-shaped crank arms (19 or 20), being pressed against it in the manner of a brake shoe. Supporting devices (36) in the form of buffer shoes are float mounted between the pistons (33) and the crank arms (19 or 20) and are held by two stays or brackets (37) to prevent them being carried in the direction of rotation (i.e., in the direction of arrow x) on the rotating crankshaft (11). To prevent lateral displacement in the axial direction of the crankshaft, lateral pins (38) are inserted to guide the support devices (36) on both sides.

When the pump is idling, no (or virtually no) feed pressure is produced, and the piston chambers (34) are also pressureless. The more the pressure that is produced in the pump working chambers (25) and thus in the pressure chambers (28) or in the pressure collecting channel (30) increases, the higher also is the pressure in the piston chambers (34) connected to the pressure collecting channel (30) by pipe (35), and the more the support devices (36) are pressed against the crank arms (19 or 20). The pressure exerted on the crankshaft (11) by the plunger pistons (24) or connecting rods (22), is met by a counter-pressure of similar magnitude on the part of the support devices (36). Thus the bending moment exerted by the plunger pistons (24) on the crankshaft is counterbalanced completely, or at least for the most part, by the counterforce of the support devices acting non-positively together with the crankshaft. Therefore a crankshaft of the same dimensions can be subjected to a greater load, or alternatively, for the same load can be dimensioned smaller. At the same time, by working together with the crankshaft only in a non-positive way, its statically determined system is preserved.

Figure 3:
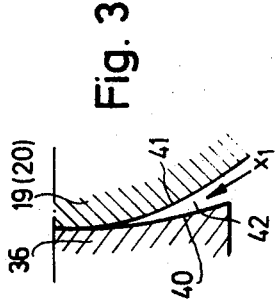

Lubrication of the crosshead (23) is usually carried out effectively by a dip lubricating system with an oil sump (39) into which the arms of the crankshaft (11) dip, carrying the lubricating oil in the direction of rotation x of the crankshaft. As is shown in FIG. 3 the supporting surface (40) of the support device (36) facing the crankshaft or crank arm, is so shaped that between it and the surface (41) of the crankshaft or arm, a wedge-shaped channel (42) is formed, in which the lubricating oil conveyed by the crankshaft or arms can penetrate in the direction of arrow $x_1$ and effect a sure lubrication between the two contacting surfaces (40 and 41). The oil that is carried out past the support devices or through the outer crank arms (18 and 21) and then spun off through centrifugal force, is collected or at least partly collected in an upper receiving pan (43) from where it can reach the sliding surfaces of the cross heads (23) via an inlet (44).

Figure 4:
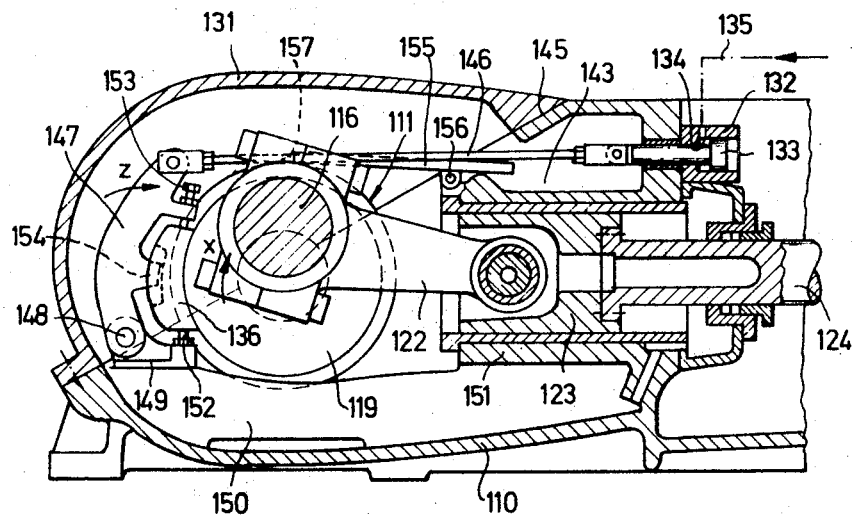

In the embodiment shown in FIG. 4 parts are numbered in the same way but increased by 100. The housing (110) has a separate housing cover (131) with an oblique partition line (145) running through the crankshaft axis. The crankshaft (111) is mounted partly in the housing (110) and partly in the cover (131). As in the first embodiment, it can have any number of crankpins desired. In FIG. 4 for example, one crank pin (116) and one crank arm (119) are shown. The connecting rods (122) are mounted on the crank pins and drive the cross heads (123) or the plunger pistons (124).

In contrast to the first described embodiment, the support devices (136) are not activated directly by pistons controlled by the pressure medium conveyed by the pump. The pressure medium is fed through a pipe (135) to the piston chamber (134) of a piston (133), that is mounted in a cylinder (132) on the side of the machine facing the pump working chamber. By means of the pressure created in the pump piston chamber (134) an intermediate lever (147) is moved in the direction of arrow z via piston (133) and a thrust rod (146), around a joint (148) which connects it to the pedestal bearing (149) in the housing (110). The housing cover is thus freed from taking up the pressure forces which are transmitted by the intermediate lever (147) to the support device (136). One or more ribs (150) reinforce the lower part of the housing (110) between the bearing (149) and the slide walls (151) of the cross heads (123) and ensure a reliable absorption of the forces brought about in the joint (148).

Either stops or set screws (152) are provided on the bearing (149) or at (153) on the intermediate lever (147) to support the supporting devices (136) in direction of rotation x of the crankshaft. Here the set screw (153) works effectively in conjunction with an end surface of the support device (136) running more or less at a tangent to the joint (148). For lateral guidance of the support device (136), lever (147) can engage by means of a lug (154), in a notch on the support device (136).

To supply the oil pan (143) above the crossheads (123) a familiar type of scoop pipe or channel (155) pivoted at (156) on the housing and resting at (157) on one of the disc-shaped crank arms, that is on one of the crank arms that is not working in conjunction with a support device (136). However, if necessary, a crank arm that is working with a support device may also be used, since even in this case enough oil is usually brought from the crank arm to be passed on to the scoop pipe or channel (155).

In the previous examples cited, a supporting shoe similar to a brake shoe was used as a support means. However, instead of this, a closed ring may also be used, but this is not solidly mounted on the housing like a normal bearing, but is merely mounted nonpositively. This could be done in the examples of models given, by providing the appropriate crankshaft (19, 20 or 119) with an enclosing ring instead of a support shoe (36 or 136).

Figure 5:
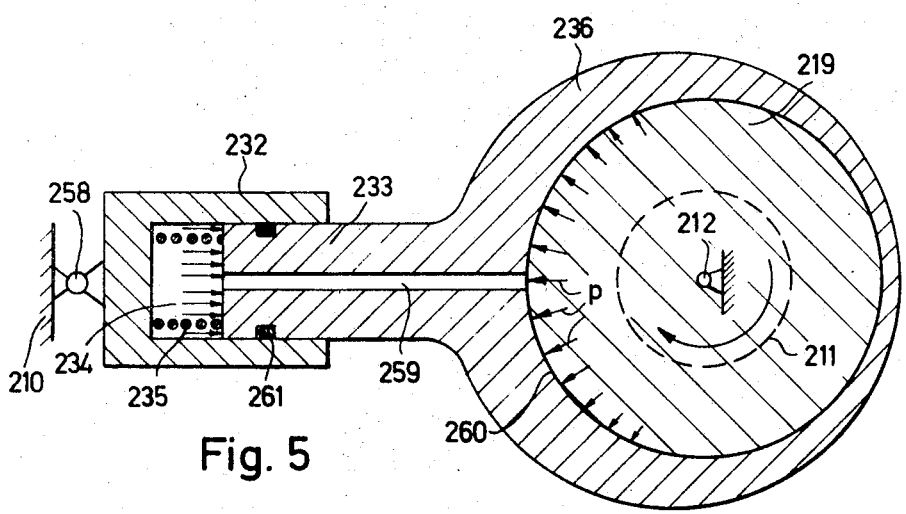

In the FIG. 5 version of the invention, such a ring is shown schematically. The ring (236) is pushed on to the crank arm (219) and is provided with a piston-like lug (233). This engages in cylinder (232) which is supported by means of joint (258) on the housing (210).

In the piston chamber (234) is a spring (235) which exerts a relatively small pressure on the piston lug (233) and thus on the crankshaft (211) the bearing of which is schematically indicated at (212).

The piston chamber (234) is connected by a bore (259) to the bearing clearance (260) on the cylindrical running path between the support ring (236) and crank arm (219). A gasket (261) seals off the piston chamber (234) at the lug (233).

As is indicated by the series of arrows P, a field of pressure is built up at the running path on the side opposite the connecting rods, which reaches its highest point at about the centre of the field. When the crank arm (219) begins to turn there arises in the bearing clearance (260) a total oil pressure which corresponds approximately to the spring power of the spring (235). At the point of entry of the bore into the bearing clearance (260), a set specific value of the total oil pressure is produced which is carried further into the piston chamber. Thus spring power plus specific pressure times the surface area of the piston (233) act upon the bearing. This combined force then produces in turn a higher total oil pressure in the bearing clearance (260), the specific pressure in the oil bore also rises, and thus the piston force also rises once more.

Thereby the force of pressure is self-energising caused by the initially small spring power of the spring (235). This excitation is similar to that of a dynamo which is initially energised by a permanent magnet. The required piston diameter for a given force of pressure can be determined by calculation and experiment. A too large a piston would cause the bearing to bind and if it is too small, the desired pressure force could not be obtained.

This version is especially suitable for pumps where the working fluid is not usable for hydraulic activation.

Further, a separate pressure means generator can be employed to convey fluids not usable for direct activation of the piston-cylinder unit. The pressure medium can either remain constant at the piston-cylinder unit, or be shut on or off by means of fixtures such as a contact manometer.

What I claim is:

1. A multi-cylinder piston machine comprising a machine housing; a plurality of cylinders fixed to said housing; a plurality of working pistons reciprocably arranged in said cylinders; a crankshaft; two end bearings turnably mounting said crankshaft in said machine housing; transmission means for transmitting power between said crankshaft and said working pistons; said transmission means applying a pressure force in one direction to said crankshaft; and yieldable pressure means for applying to said crankshaft a force in a direction opposite to said one direction to at least partly compensate the pressure force applied by said transmission means to said crankshaft.

2. A machine as defined in claim 1, wherein said crankshaft has at least two crank pins and a crank arm arranged between and connecting said crank pins, said yieldable pressure means acting on said crank arm.

3. A machine as defined in claim 1, wherein said crankshaft has at least three crank pins with a crank arm between each two of said crank pins, said yieldable pressure means acting at least on one of said crank arms.

4. A machine as defined in claim 1, wherein said yieldable pressure means comprise spring means.

5. A machine as defined in claim 1, wherein said yieldable pressure means comprise a movable member arranged to be pressed against said crankshaft, and means for pressing this member by pressure fluid against the crankshaft.

6. A machine as defined in claim 1, wherein said machine is a pump and wherein said yieldable pressure means comprise movable means arranged to be pressed against said crankshaft, and including pressure responsive means subjected to and movable in accordance with the fluid pressure produced by the pump, and mechanical transmission means between said movable means and said pressure responsive means for pressing said movable means against said crankshaft in dependence upon fluid pressure produced by said pump.

7. A machine as defined in claim 1, and including an oil sump in said housing beneath said crankshaft, said crankshaft having a portion having a cylindrical outer surface coaxial with the axis of said end bearings and dipping in said oil sump, said yieldable pressure means comprising a member engaging with a surface thereof said cylindrical surface, said member surface and said cylindrical surface defining between themselves a channel tapering in direction of rotation of said crankshaft for the lubricating oil carried by the crankshaft portion out of the oil sump.

8. A machine as defined in claim 1, wherein said crankshaft comprises a portion coaxial with the axis of said end bearings and having a cylindrical outer surface, said yieldable pressure means comprising a shoe adapted to engage said cylindrical surface and extending about the same through an angle of less than 180°.

9. A machine as defined in claim 1, wherein said crankshaft comprises a portion coaxial with said end bearings and having a cylindrical outer surface, said yieldable pressure means comprising an annular member closely surrounding said cylindrical portion.

10. A machine as defined in claim 1, and including guide means fastened to said housing opposite said cylinders, said yieldable pressure means comprising a member guided in said guide means.

11. A machine as defined in claim 1, wherein said crankshaft has a portion coaxial with said end bearings and having an external cylindrical surface, said yieldable pressure comprising an annular member closely surrounding said cylindrical surface, a pistonlike lug integral with said annular member and projecting therefrom in said opposite direction, a guide cylinder fixed to said housing, said lug having an end portion fluidtightly guided in said guide cylinder, a bore extending through said lug and said annular member, and a fluid filling said guide cylinder and said bore.

12. A machine as defined in claim 5, wherein said machine is a pump, and including means for transmitting pressure fluid from at least one of said cylinders to said means for pressing said member by pressure fluid against said crankshaft so that said yieldable pressure means will exert on said crankshaft a compensating force in dependence on the fluid pressure in said one cylinder.

13. A machine as defined in claim 6, wherein said movable means comprise a shoe in contact with said crankshaft, a lever engaging said shoe and being pivoted at one end to said machine housing, said mechanical transmission means being connected to the other end of said lever.

14. A machine as defined in claim 8, and including means supporting said shoe against movement in the direction of rotation of said crankshaft and in axial direction of the latter.

15. A machine as defined in claim 10, wherein said guide means comprise a guide cylinder and said member a piston-like pressure member reciprocable in said guide cylinder, and including a source of pressure fluid communicating with said guide cylinder for pressing said pressure member against said crankshaft.

16. A machine as defined in claim 11, and including spring means for pressing said annular member in said opposite direction against said cylindrical surface.

17. A machine as defined in claim 12, wherein said yieldable pressure means comprise a piston-like pressure member, said means for transmitting pressure fluid transmit said pressure fluid to said piston-like member for pressing the latter in said opposite direction against said crankshaft.

18. A machine as defined in claim 12, and including a pressure chamber communicating with said cylinders, said means for transmitting pressure fluid to said means for pressing said member by pressure fluid against said crankshaft communicating with said pressure chamber.

19. A machine as defined in claim 14, wherein said support means comprise two stay parts fixed to said housing to prevent movement of said shoe in the direction of rotation of said crankshaft and lug arrangements on both sides of said stay parts for supporting said shoe against movement in the direction of the crankshaft axis.

20. A machine as defined in claim 16, wherein said spring means comprise a compression spring in said guide cylinder and engaging the end portion of said lug.

* * * * *